US012562817B2

(12) United States Patent
Kim et al.

(10) Patent No.: US 12,562,817 B2
(45) Date of Patent: Feb. 24, 2026

(54) COMMUNICATION APPARATUS AND COMMUNICATION METHOD

(71) Applicant: NTT, Inc., Tokyo (JP)

(72) Inventors: Sang-Yuep Kim, Musashino (JP); Junichi Kani, Musashino (JP)

(73) Assignee: NTT, Inc., Tokyo (JP)

( * ) Notice: Subject to any disclaimer, the term of this patent is extended or adjusted under 35 U.S.C. 154(b) by 285 days.

(21) Appl. No.: 18/274,266

(22) PCT Filed: Feb. 4, 2021

(86) PCT No.: PCT/JP2021/004050
§ 371 (c)(1),
(2) Date: Jul. 26, 2023

(87) PCT Pub. No.: WO2022/168218
PCT Pub. Date: Aug. 11, 2022

(65) Prior Publication Data
US 2024/0089009 A1 Mar. 14, 2024

(51) Int. Cl.
| | |
|---|---|
| H04B 10/61 | (2013.01) |
| H04B 10/077 | (2013.01) |
| H04B 10/272 | (2013.01) |
| H04L 27/02 | (2006.01) |
| H04L 27/26 | (2006.01) |

(52) U.S. Cl.
CPC ....... *H04B 10/6165* (2013.01); *H04B 10/077* (2013.01); *H04B 10/272* (2013.01); *H04L 27/02* (2013.01); *H04L 27/2665* (2013.01)

(58) Field of Classification Search
None
See application file for complete search history.

(56) References Cited

U.S. PATENT DOCUMENTS

| | | | | |
|---|---|---|---|---|
| 11,387,929 B1 * | 7/2022 | Zhang | ................ | H04B 10/6166 |
| 2007/0172236 A1 * | 7/2007 | Nomura | ............. | H04Q 11/0067 |
| | | | | 398/45 |
| 2015/0372766 A1 * | 12/2015 | Yoshida | ................ | H04B 10/61 |
| | | | | 398/208 |
| 2019/0089463 A1 * | 3/2019 | Zhang | ................. | H04B 10/272 |
| 2020/0007241 A1 * | 1/2020 | Miura | ................. | H04B 10/532 |
| 2021/0399809 A1 * | 12/2021 | Igarashi | ................. | H04L 27/20 |
| 2023/0208542 A1 * | 6/2023 | Krampl | ................ | H04J 3/0605 |
| | | | | 398/43 |

OTHER PUBLICATIONS

Kim et a: "Performance Analysis of Phase Noise Cancellation by Asymmetric CMA for Realizing Affordable Coherent PON Transceivers", Journal of Lightwave Technology, vol. 38, No. 8, Apr. 2020, pp. 2231-2241 (Year: 2020).*
Sang-Yuep Kim et al.,Performance Analysis of Phase Noise Cancellation by Asymmetric CMA for Realizing Affordable Coherent PON Transceivers ,Journal of Lightwave Technology,IEEE,2020, vol. 38, Issue 8 ,pp. 2231-2241.
K. Kasai, "Single-Channel 400-GB/s OTDM-32 RZ/QAM Coherent Transmission Over 225 km Using an Optical Phase-Locked Loop Technique", IEEE Photonics Technology Letters, vol. 22, No. 8, Apr. 15, 2010.

* cited by examiner

*Primary Examiner* — Li Liu

(57) ABSTRACT

The communication device includes: a reception unit that receives burst frame signals from a plurality of other communication devices respectively; and a control unit that changes a block length of a moving average filter in carrier phase synchronization so as to minimize a phase noise amount of the burst frame signals.

8 Claims, 6 Drawing Sheets

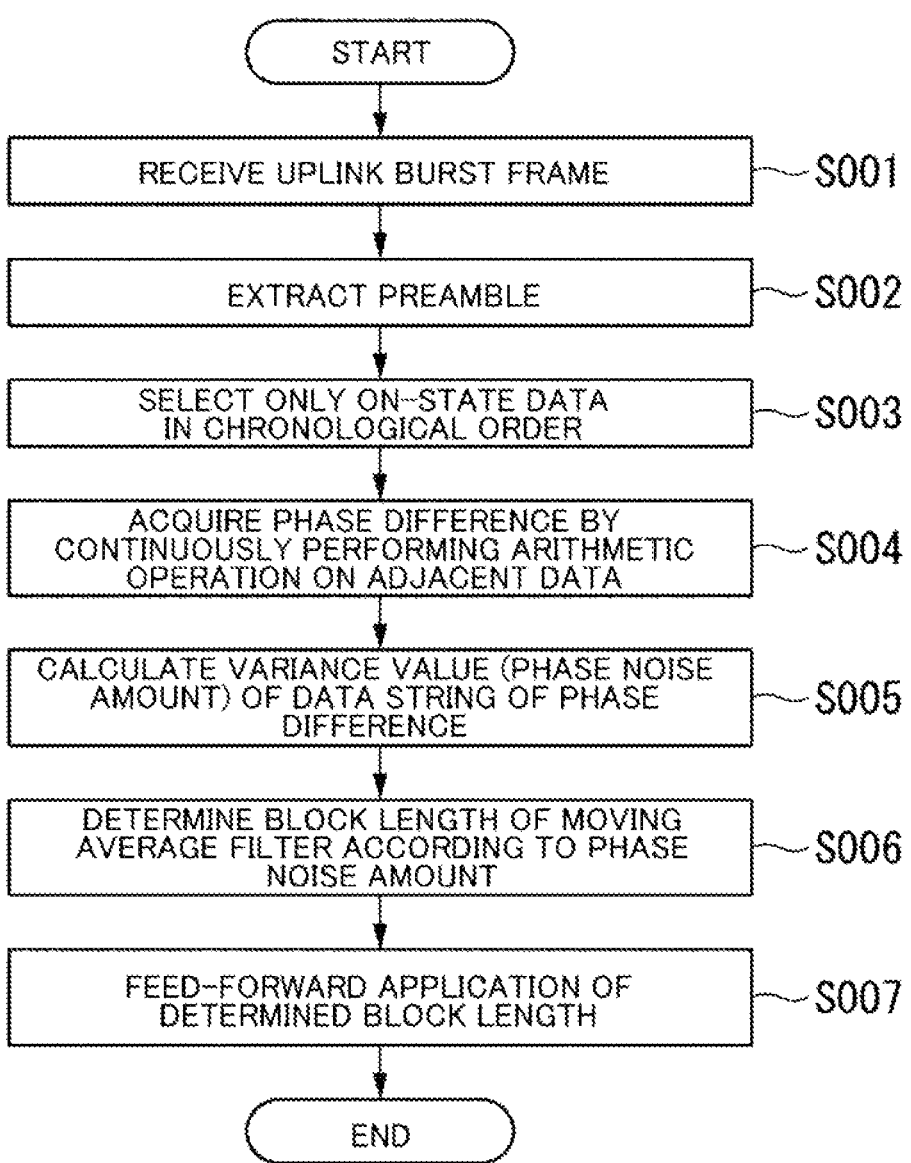

START

RECEIVE UPLINK BURST FRAME — S001

EXTRACT PREAMBLE — S002

SELECT ONLY ON-STATE DATA
IN CHRONOLOGICAL ORDER — S003

ACQUIRE PHASE DIFFERENCE BY
CONTINUOUSLY PERFORMING ARITHMETIC
OPERATION ON ADJACENT DATA — S004

CALCULATE VARIANCE VALUE (PHASE NOISE
AMOUNT) OF DATA STRING OF PHASE
DIFFERENCE — S005

DETERMINE BLOCK LENGTH OF MOVING
AVERAGE FILTER ACCORDING TO PHASE
NOISE AMOUNT — S006

FEED-FORWARD APPLICATION OF
DETERMINED BLOCK LENGTH — S007

END

FIG. 3

COMMUNICATION APPARATUS AND COMMUNICATION METHOD

CROSS-REFERENCE TO RELATED APPLICATIONS

This application is a 371 National Stage of International Application No. PCT/JP2021/004050, filed on Feb. 4, 2021. The entire disclosure of the above application is incorporated herein by reference.

TECHNICAL FIELD

The present invention relates to a communication apparatus and a communication method.

BACKGROUND ART

Currently, as an optical access network, GE-PON standardized in IEEE 802.3 and G-PON standardized in ITU-T G.984 series have been commercialized. In GE-PON and G-PON, a plurality of optical network units (ONUs) perform point-to-multipoint (P-to-MP) communication with an optical line termination device (OLT) via an optical splitter.

An uplink signal from each ONU is modulated by On-Off keying (OOK) by on/off binary values, and transmitted as a burst frame signal in a predetermined time slot. Uplink burst frame signals from the plurality of ONUs are multiplexed by time division multiple access (TDMA) and transmitted to the OUT. The OLT receives an uplink signal by direct detection.

In TDMA PON such as GE-PON or G-PON, when the ONU is connected to the PON first, the OLT imparts identification information (ONU ID) to the ONU by a function called discovery (or ranging), and measures the distance between the ONU and the OLT. By using this information, dynamic band allocation (DBA) is performed so that OLT arrival times of burst frame signals from respective ONUs do not overlap.

As the next generation optical access technology, the application of multi-level modulation and digital coherent demodulation to an optical access network has been studied. The phase/intensity modulation of four or more values can assign a lame number of bits to one symbol, and is therefore excellent in high speed modulation. The digital coherent demodulation amplifies the received signal from the power of the local oscillation light, and is therefore excellent in expansion and extension of the number of branches of the optical splitter. Therefore, by applying multi-level modulation and digital coherent demodulation, both high speed and extension can be achieved.

CITATION LIST

Non Patent Literature

[NPL 1] K. Kasai, "Single-Channel 400-Gb/s OTDM-32 RZ/QAM Coherent Transmission Over 225 km Using an Optical Phase-Locked Loop Technique", IEEE PHOTONICS TECHNOLOGY LETTERS, VOL, 22, NO. 8, Apr. 15, 2010.

SUMMARY OF INVENTION

Technical Problem

In uplink transmission of a point-to-multipoint PON, when a burst frame signal of each ONU subjected to time division multiplexing is coherently received by an OLT, the burst frame signal of each ONU is generated from laser light sources having different oscillation characteristics. The oscillation characteristics vary depending on, for example, a difference between the operating temperature and the state of vibration, a reason for manufacturing the semiconductor of the electro-optical device, and the like. Therefore, there is a problem that phase noise different for each ONU exists in a multi-level phase modulation burst frame signal received by an OLT having one local oscillation light. On the other hand, in the OPLL (Optical Phase-Locked Loop) technique described in, for example, NPL 1, although phase noise is suppressed by using a special laser light source, since addition of high-precision electric and optical devices is assumed, the system configuration becomes complicated and it is difficult to realize the optical PLL technique.

In view of the above circumstances, an object of the present invention is to provide a communication apparatus and a communication method capable of allowing for phase noise different for each ONU for a multi-level phase modulation burst frame signal while suppressing complication of a system configuration.

Solution to Problem

One aspect of the present invention is a communication device comprising: a reception unit that coherently receives burst frame signals from a plurality of other communication devices respectively; and a control unit that changes a block length of a moving average filter in carrier phase synchronization so as to minimize a phase noise amount of the burst frame signals.

One aspect of the present invention is a communication method comprising: a reception step of coherently receiving burst frame signals from a plurality of other communication devices respectively; and a control step of changing a block length of a moving average filter in carrier phase synchronization so as to minimize a phase noise amount of the burst frame signals.

Advantageous Effects of Invention

According to the present invention, phase noise different for each ONU can be allowed for the multi-level phase modulation burst frame signal while suppressing complication of a system configuration.

BRIEF DESCRIPTION OF DRAWINGS

FIG. 3 is a flowchart showing an operation of the OLT 3 according to the first embodiment of the present invention.

DESCRIPTION OF EMBODIMENTS

Hereinafter, embodiments of the present invention will be described in detail with reference to the drawings. In the following description, a character following the symbol "^" represents a superscript character, and the character following the symbol "_" represents a subscript character. For example, "A_B^C" has "C" represents "A" having "C" as a superscript character and "B" as a subscript character.

First Embodiment

Hereinafter, a first embodiment of the present invention will be described.

[Configuration of TDMA-PON System]

Figure 1:
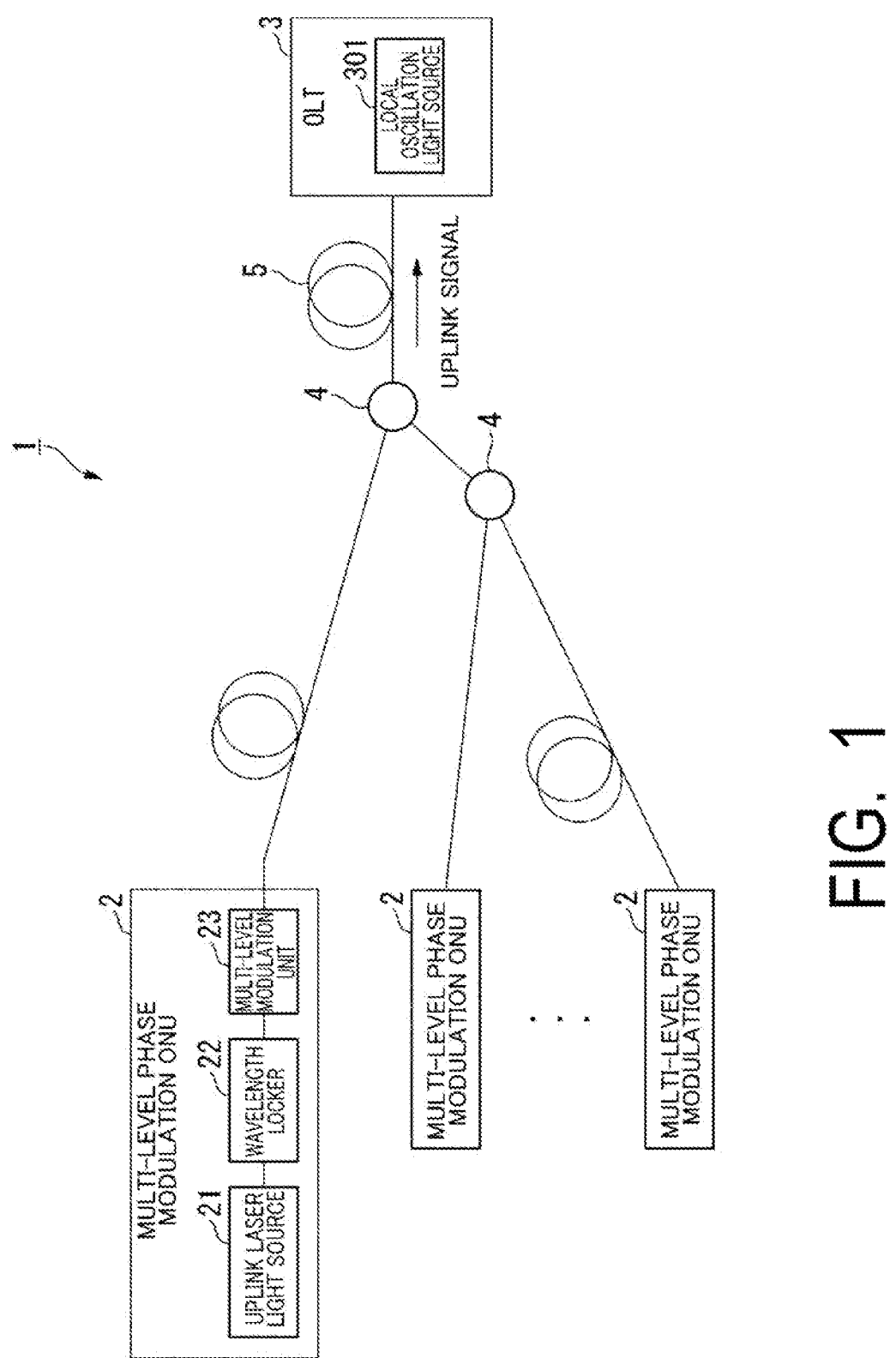
FIG. 1 is a block diagram showing a configuration of a TDMA-PON system 1 according to a first embodiment of the present invention.

A configuration of a TDMA-PON system 1 to which multi-level nodulation/coherent reception is applied will be described below FIG. 1 is a block diagram showing a configuration of the TDMA-PON system 1 according to the first embodiment of the present invention.

As shown in FIG. 1, the TDMA-PON system 1 includes a plurality of multi-level ONUs 2, an OLT 3, a plurality of optical power splitters 4, and an optical fiber 5. The plurality of ONUs 2 and the OLT 3 are connected to each other via the optical fiber 5. The optical fiber 5 is branched and coupled by the optical power splitters 4.

The multi-level phase modulation ONUs 2 include an upstream laser light source 21, a wavelength locker 22, and a multi-level modulation unit 23. Each multi-level phase modulation ONU 2 has mutually different upstream laser light sources 21. The OLT 3 includes a local oscillation light source 301.

The wavelength locker synchronizes the wavelength of a laser beam output from the upstream laser light source 21 with local oscillation light output from the local oscillation light source 301 of the our 3.

The multi-level modulation unit 23 generates an uplink burst frame signal by multi-level-modulating the laser beam output from the wavelength locker 22. OOK modulation which is not affected by phase noise is used for a preamble of the uplink burst frame signal.

The OLT 3 coherently receives an uplink burst frame signal output from each multi-level phase modulation ONU 2 by using the local oscillation light source 301.

[Configuration of OLT]

Figure 2:
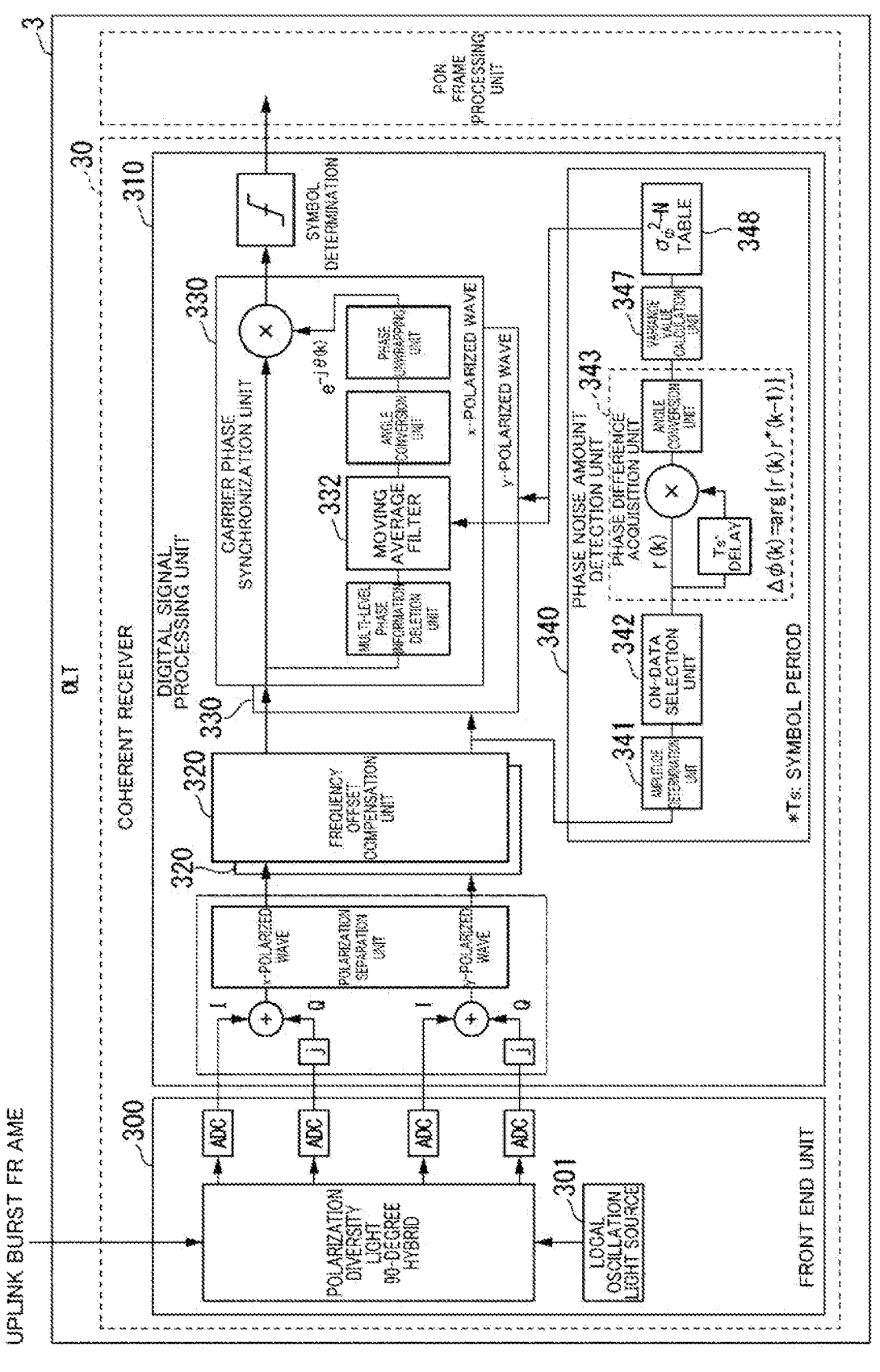
FIG. 2 is a block diagram showing a configuration of an OLT 3 according to the first embodiment of the present invention.

A configuration of the OLT 3 will be described below FIG. 2 is a block diagram showing the configuration of the OLT 3 according to the first embodiment of the present invention.

The OLT 3 according to the present embodiment measures a phase noise amount from a preamble of an uplink burst frame signal transmitted from each multi-level phase modulation ONU 2. The OLT 3 variably controls a block length of a moving average filter of carrier phase synchronization of a coherent receiver so as to minimize a phase noise amount of the uplink burst frame signal for each received uplink burst flame signal.

In the present embodiment, the configuration of the TDMA-PON system 1 having the multi-level phase modulation ONU 2 and the OUT 3 is described as an example, but the system capable of providing the present invention is not limited to this configuration. For example, the present invention is not limited to a PON system and can be applied to all burst optical communication networks having a Point-to-Multipoint configuration or a Multipoint-to-Multipoint configuration.

As shown in FIG. 2, the OLT 3 includes a coherent receiver 30. The coherent receiver 30 includes a digital signal processing unit 310. The digital signal processing unit 310 includes a frequency offset compensation unit 320 for each of an x-polarized wave and a y-polarized wave, a carrier phase synchronization unit 330 for each of the x-polarized wave and the v-polarized wave, and a phase noise amount detection unit 340.

The carrier phase synchronization unit 330 includes a moving average filter 332. The phase noise amount detection unit 340 includes an amplitude determination unit 341, an on-data selection unit 342, a phase difference acquisition unit 343, a variance value calculation unit 347, and a $\sigma\_\varphi^2$-N table 348.

The phase noise amount detection unit 340 measures a phase noise amount in a preamble section of the uplink burst frame signal subjected to time division multiplexing.

The amplitude determination unit 341 of the phase noise amount detection unit 340 acquires a time-division multiplexed uplink burst frame signal output from the frequency offset compensation unit 320. The amplitude determination unit 341 performs amplitude determination using a predetermined threshold and extracts a preamble of an OOK-modulated uplink burst frame signal. The threshold value is set to, for example, 10 [dB]. The amplitude determination unit 341 outputs the extracted preamble to the on-data selection unit 342.

The on-data selection unit 342 acquires the preamble output from the amplitude determination unit 341. The on-data selection unit 342 selects, in chronological order, only on-state data in which the optical power exists, from among the acquired preambles. Hereinafter, the time-series on-state data is represented as r(k). The on-data selection unit 342 outputs the selected time-series data to the phase difference acquisition unit 343.

The phase difference acquisition unit 343 acquires the time-series data output from the on-data selection unit 342. The phase difference acquisition unit 343 continuously performs arithmetic processing defined by an arithmetic expression of $\arg\{r(k)r^*(k-1)\}$ to two pieces of adjacent data in the acquired time-series data. Thus, the phase noise amount detection unit 340 sequentially acquires a phase difference $\Delta\varphi(k)$. The phase noise amount detection unit 340 records the value of the phase difference $\Delta\varphi(k)$ on a storage medium (not shown) such as a memory.

The variance value calculating unit 347 refers to a data string of the value of the phase difference $\Delta\varphi(k)$ recorded in the storage medium, and calculates the variance value $\sigma\_\varphi^2$. Here, the dispersion value $\sigma\_\varphi^2$ is defined as a phase noise amount (see, for example, the following reference literature). (Reference Literature: Y. Atzmon, et al., "Laser Phase Noise in Coherent and Differential Optical Transmission Revisited in the Polar Domain", Journal of Lightwave Technology, Vol. 27, No. 1, pp. 19-29, Jan. 1, 2009."). However, the phase difference measurable by the phase noise amount detection unit 340 is 2 π at the maximum in OOK modulation.

The moving average filter 332 of the carrier phase synchronization unit 330 eliminates the influence of AWGN (Additive White Gaussian Noise) such as thermal noise.

The carrier phase synchronization unit 330 compares the calculated variance value $\sigma\_\varphi^2$ with a previously prepared $\sigma\_\varphi^2$-N table 348 to obtain a block length N corresponding to the variance value $\sigma\_\varphi^2$. In other words, the carrier phase synchronization unit 330 determines the block length N of the moving average filter 332 in accordance with the phase noise amount measured by the phase noise amount detection unit 340. The carrier phase synchronization unit 330 does not perform variable control of the block length N of the moving average filter 332 in the preamble section of the uplink burst frame signal.

The carrier phase synchronization unit 330 applies the determined block length N of the moving average filter 332 by means of feed-forward to the payload section subjected to multi-level phase modulation of the uplink burst frame signal. The same block length N is used for carrier phase synchronization between the x-polarized wave and the y-po-larized wave.

With such a configuration, a carrier phase θ(k) is esti-mated with minimized phase noise for the payload section subjected to multi-level phase modulation, and carrier phase synchronization is accurately performed. This improves reception performance.

[Operation of OLT]

An example of an operation of the OLT 3 will be described below. FIG. 3 is a flowchart showing the operation of the OLT 3 according to the first embodiment of the present invention.

A front end 300 of the OLT 3 coherently receives an uplink burst frame signal output from each multi-level phase modulation ONU 2 by using the local oscillation light source 301 (step S001).

The amplitude determination unit 341 of the phase noise amount detection unit 340 acquires a time-division multi-plexed uplink burst frame signal. The amplitude determina-tion unit 341 performs amplitude determination using a predetermined threshold and extracts a preamble of an OOK-modulated uplink burst frame signal (step S002).

The on-data selection unit 342 acquires the preamble output from the amplitude determination unit 341. The on-data selection unit 342 selects, in chronological order, only the on-state data in which the optical power exists, from among the acquired preambles (step S003).

The phase difference acquisition unit 343 acquires the time-series data output from the on-data selection unit 342. The phase difference acquisition unit 343 continuously performs arithmetic processing defined by an arithmetic expression of arg{r(k)r*(k−1)} for two pieces of adjacent data in the acquired time-series data, to acquire the phase difference Δφ(k) (step S004).

The variance value calculation unit 347 calculates the variance value σ_φ^2 by referring to a data string of the value of the phase difference Δφ(k) recorded in the storage medium (step S005). As described above, the variance value σ_φ^2 is defined as the phase noise amount.

The carrier phase synchronizing unit 330 compares the calculated variance value σ_φ^2 with the previously pre-pared σ_φ^2-N table 348 to determine the block length N of the moving average filter 332 according to the phase noise amount measured by the phase noise amount detection unit 340 (step S006).

The carrier phase synchronization unit 330 applies the determined block length N of the moving average filter 332 by means of feed-forward to a payload section subjected to multi-level phase modulation of the uplink burst frame signal (step S007). This completes the operation of the OLT 3 shown in the flowchart of FIG. 3.

As described above, the OLT 3 according to the first embodiment measures the phase noise amount from the preamble of the uplink burst frame signal transmitted from each of the multi-English Translation of level phase modu-lation ONUs 2. The OLT 3 variably controls the block length of the moving average filter of carrier phase synchronization of the coherent receiver so as to minimize the phase noise amount of the uplink burst frame signal for each received uplink burst frame signal.

With such a configuration, the OLT 3 according to the present embodiment can allow for phase noise different for each ONU for the multi-level phase modulation burst frame signal by using one local oscillation light.

Second Embodiment

Hereinafter, a second embodiment of the present inven-tion will be described. The block diagram showing a con-figuration of a TDMA-PON system according to the present embodiment is the same as the block diagram showing the configuration of the TDMA-PON system 1 according to the first embodiment shown in FIG. 1; thus, the explanation is omitted. In the following description, the same reference symbols will be used for the same functional units as those of the TDMA-PON system 1 of the first embodiment.

In the present embodiment, in a discovery (ranging) operation, OOK modulation which is not affected by phase noise is used for an uplink signal transmitted from each multi-level phase modulation ONU 2.

[Configuration of OLT]

Figure 4:
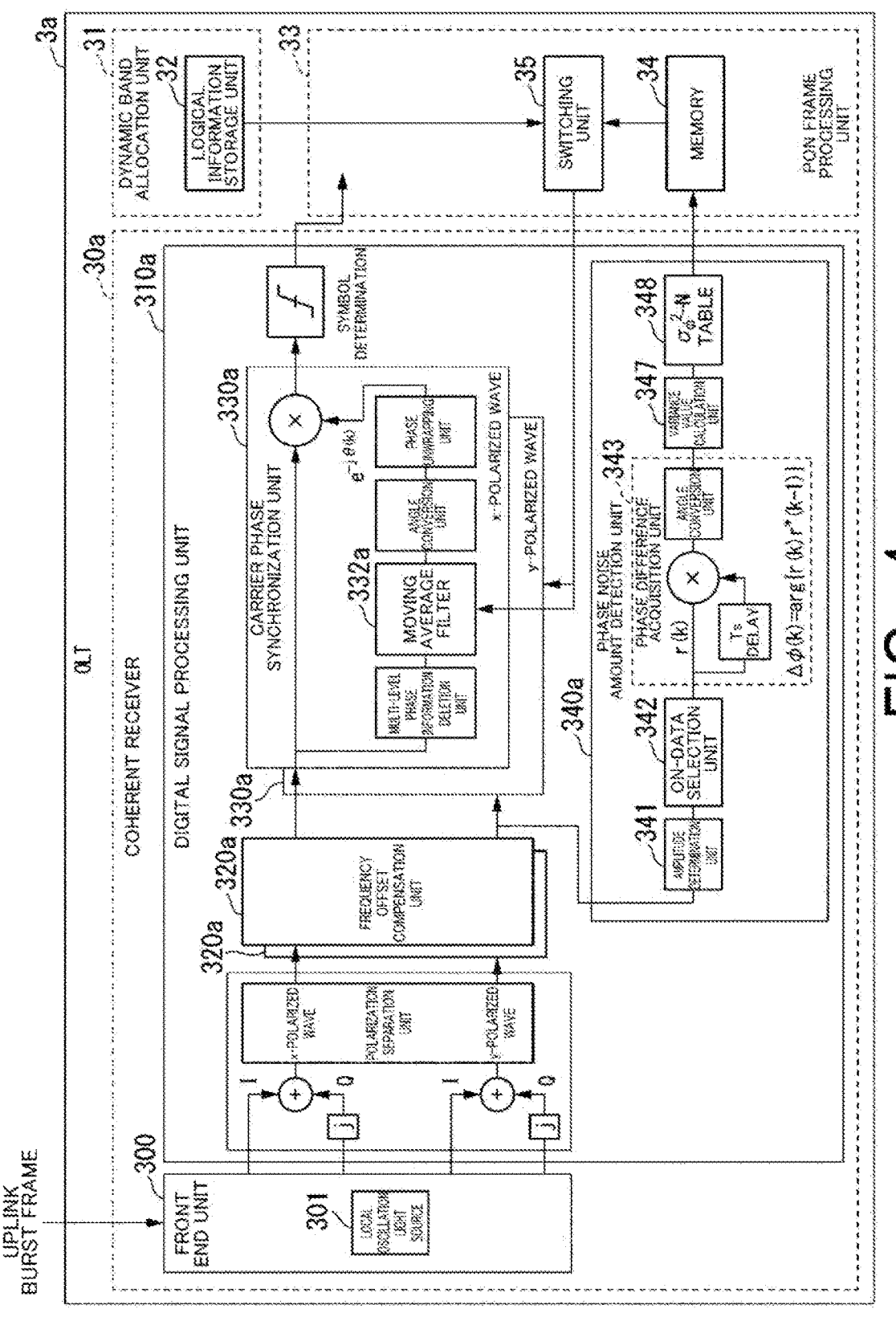
FIG. 4 is a block diagram showing a configuration of an OLT 3a according to a second embodiment of the present invention.

A configuration of the OLT 3a will be described below. FIG. 4 is a block diagram showing the configuration of the OLT 3a according to a second embodiment of the present invention. In the following, the configuration of the OLT 3a will be described, focusing on the portions that differ from those of the configuration of the OLT 3 of the first embodi-ment.

The OLT 3a according to the present embodiment mea-sures a phase noise amount from an uplink burst frame signal during a discovery (ranging) operation. On the basis of logical information that the OLT 3a has, the OLT 3a controls the block length of the moving average filter of carrier phase synchronization for each discovery (ranging) period so as to minimize the phase noise amount of the uplink burst frame signal. The logical information here includes information indicating the arrival time of each signal of the uplink burst frame signal used in dynamic band allocation (DBA).

In the present embodiment, the configuration of the TDMA-PON system 1 having the multi-level phase modu-lation ONU 2 and the OLT 3 *a* will be described as an example, but the system capable of providing the present invention is not limited to this configuration. For example, the present invention is not limited to a PON system and can be applied to all burst optical communication networks having a Point-to-Multipoint configuration or a Multipoint-to-Multipoint configuration.

As shown in FIG. 4, the OLT 3a includes a coherent receiver 30a, a dynamic band allocation unit 31, and a PON frame processing unit 33.

The coherent receiver 30a includes a digital signal pro-cessing unit 310a. The digital signal processing unit 310a includes a frequency offset compensation unit 320a for each of the x-polarized wave and the y-polarized wave, a carrier phase synchronization unit 330a for each of the x-polarized wave and the y-polarized wave, and a phase noise amount detection unit 340a. The carrier phase synchronization unit 330a includes a moving average filter 332a.

The dynamic band allocation unit 31 includes a logical information storage unit 32. The logical information storage unit 32 stores logical information. As described above, the logical information includes information indicating the arrival time of each signal of the uplink burst frame signal used in the dynamic band allocation (DBA).

The PON frame processing unit 33 includes a memory 34 and a switching unit 35. The memory 34 stores information indicating the block length N for minimizing the phase noise amount of each multi-level phase modulation ONU 2.

As described above, OOK modulation which is not affected by phase noise is used for the uplink burst frame signal during the discovery (ranging) operation.

The phase noise amount detection unit 340a executes phase noise amount detection only during the discovery (ranging) operation, and measures the phase noise amount from the received uplink burst frame signal.

The carrier phase synchronization unit 330a does not control the block length N of the moving average filter 332a in the discovery (ranging) section.

When a new multi-level phase modulation ONU 2 is connected to the TDMA-PON system 1, the phase noise amount detection unit 340a records information indicating the block length N for minimizing the phase noise amount of the multi-level phase modulation ONU 2 in a memory 34 of a PON frame processing unit 33.

After the discovery (ranging) operation is completed, the switching unit 35 of the PON frame processing unit 33 refers to the memory 34 and acquires information indicating the block length N. The switching unit 35 refers to the logical information storage unit 32 of the dynamic band allocation unit 31 and acquires logical information (that is, information indicating the arrival time of the uplink burst frame signal from each multi-level phase modulation ONU 2).

The switching unit 35 switches the block length N of the moving average filter 332a in accordance with the arrival time of the uplink burst frame signal from each multi-level phase modulation ONU 2 on the basis of the information indicating the block length N and the information indicating the arrival time of the uplink burst frame signal from each multi-level phase modulation ONU 2.

[Operation of OLT]

Figure 5:
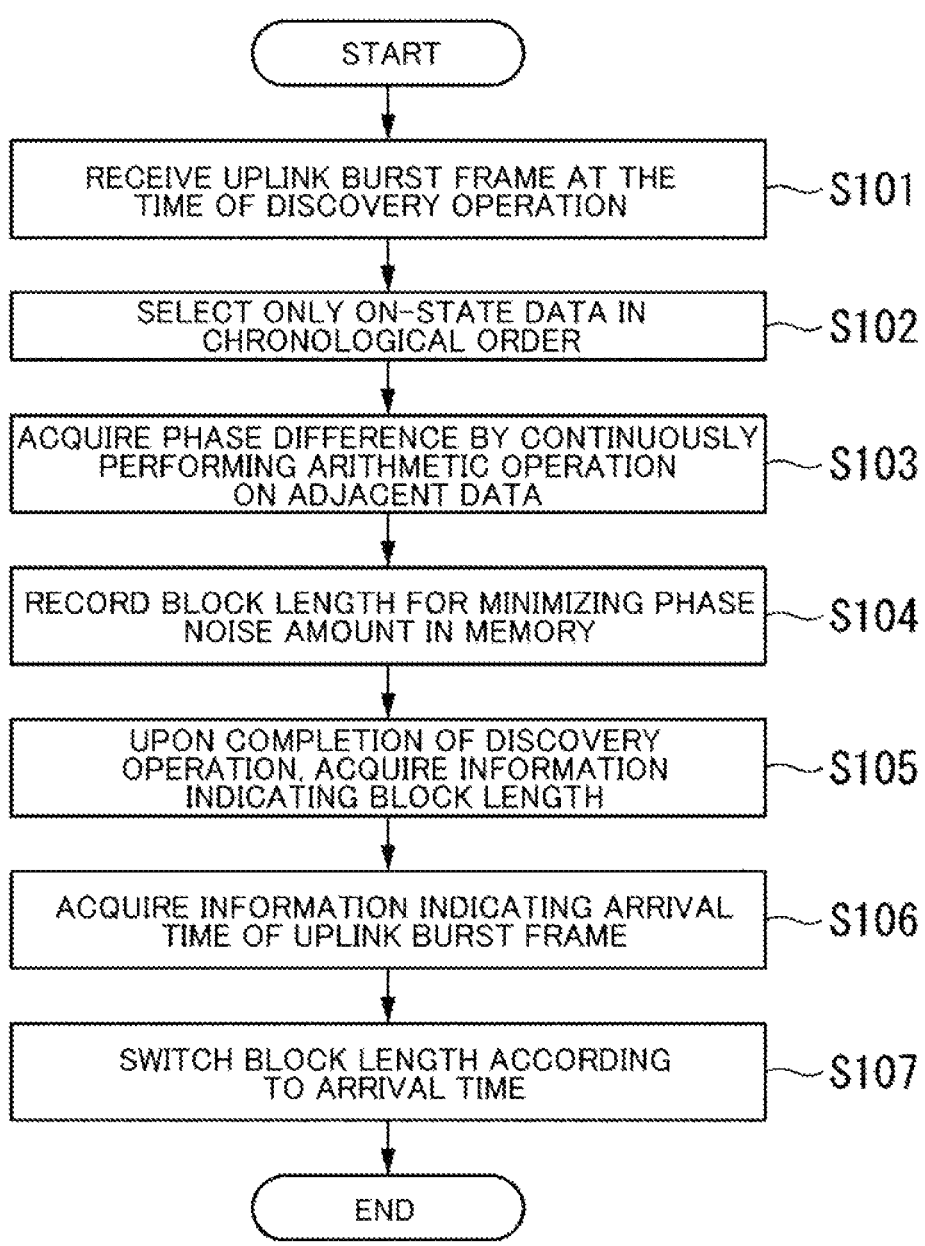
FIG. 5 is a flowchart showing an operation of the OLT 3a according to the second embodiment of the present invention.

An example of an operation of the OLT 3a will be described below. FIG. 5 is a flowchart showing the operation of the OLT 3a according to the second embodiment of the present invention.

The front end 300 of the OLT 3a coherently receives an uplink burst frame signal output from each multi-level phase modulation ONU 2 at the time of the execution of a discovery operation, by using the local oscillation light source 301 (step S101).

The on-data selection unit 342 acquires an uplink burst frame signal at the time of the execution of the discovery operation. The on-data selection unit 342 selects, in chronological order, only the on-state data in which the optical power exists, from among the acquired uplink burst frame signals (step S102).

The phase difference acquisition unit 343 acquires the time-series data output from the on-data selection unit 342. The phase difference acquisition unit 343 continuously performs an arithmetic operation represented by an expression of $\arg\{r(k)\,r^*(k-1)\}$ on two pieces of adjacent data in the acquired time-series data, and acquires the phase difference $\Delta\varphi(k)$ (step S103).

The variance value calculation unit 347 calculates the variance value $\sigma\_\varphi^2$ by referring to a data string of the value of the phase difference $\Delta\varphi(k)$ recorded in the storage medium. As described above, the variance value $\sigma\_\varphi^2$ is defined as the phase noise amount. The phase noise amount detection unit 340a records information indicating the block length N for minimizing the phase noise amount of the multi-level phase modulation ONU 2 in the memory 34 of the PON frame processing unit 33 (step S104).

After the discovery (ranging) operation is completed, the switching unit 35 of the PON frame processing unit 33 refers to the memory 34 and acquires the information indicating the block length N (step S105). The switching unit 35 refers to the logical information storage unit 32 of the dynamic band allocation unit 31 and acquires the logical information (that is, information indicating the arrival time of the uplink burst frame signal from each multi-level phase modulation ONU 2) (step S106).

The switching unit 35 switches the block length N of the moving average filter 332a in accordance with the arrival time of the uplink burst frame signal from each multi-level phase modulation ONU 2 on the basis of the information indicating the block length N and the English Translation of information indicating the arnval time of the uplink burst frame signal from each multi-level phase modulation ONU 2 (step S107). This completes the operation of the OLT 3a shown in the flowchart of FIG. 5.

As described above, on the basis of logical information that the OLT 3a has, the OLT 3a according to the second embodiment updates (switches) the block length N of the moving average filter 332a for each discovery (ranging) period. By providing such a configuration, the OLT 3a according to the present embodiment can reduce processing related to measurement of a phase noise amount for each uplink burst frame signal and processing related to calculation necessary for access to the table in the OLT 3 of the first embodiment.

Third Embodiment

Hereinafter, a third embodiment of the present invention will be described. The block diagram showing a configuration of a TDMA-PON system according to the present embodiment is the same as the block diagram showing the configuration of the TDMA-PON system 1 according to the first embodiment shown in FIG. 1; thus, the explanation is omitted. In the following description, the same reference symbols will be used for the same functional units as those of the TDMA-PON system 1 of the first embodiment.

[Configuration of OLT]

Figure 6:
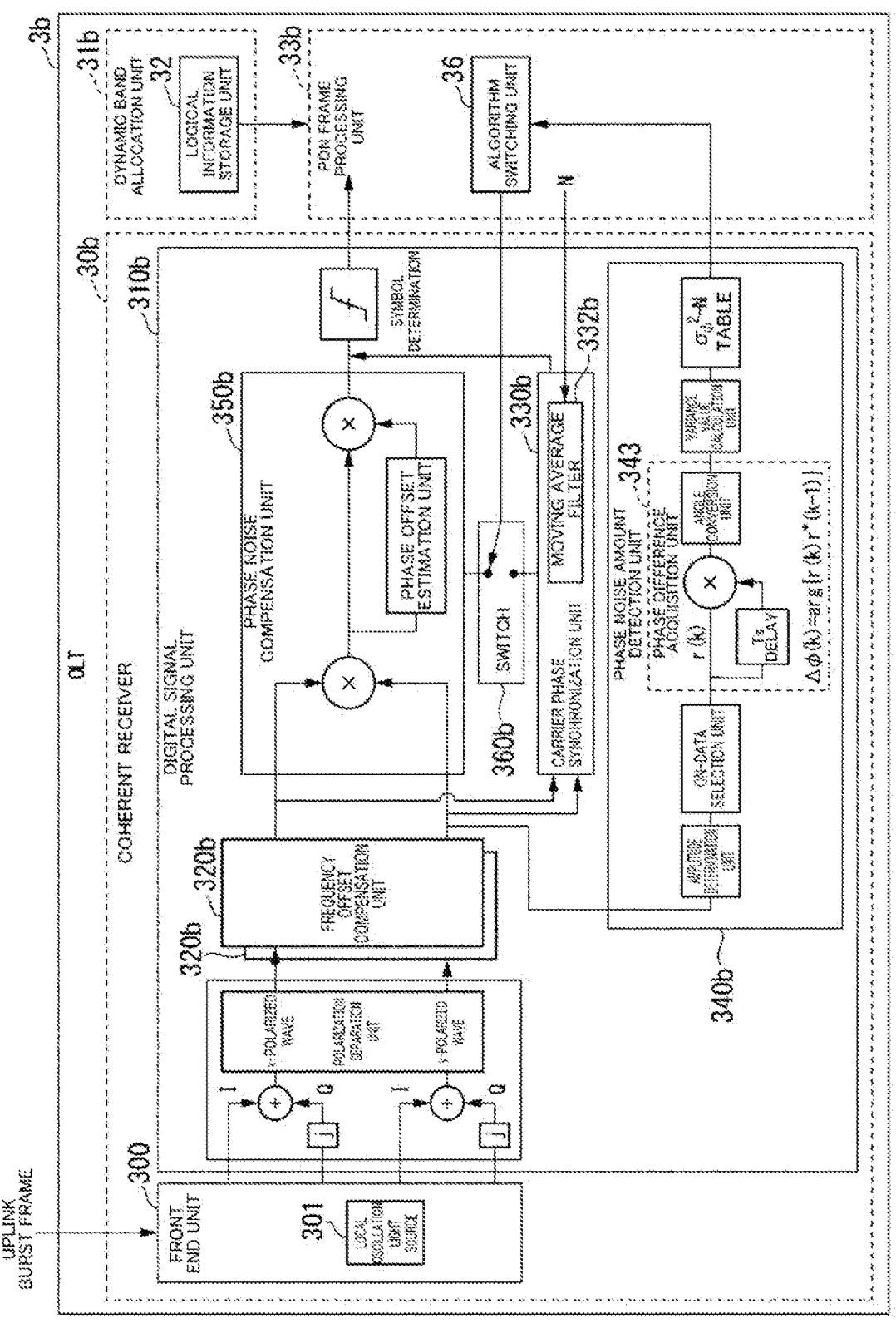
FIG. 6 is a block diagram of a configuration of an OLT 3b according to a third embodiment of the present invention.

A configuration of the OLT 3b will be described below. FIG. 6 is a block diagram showing the configuration of the OLT 3b according to a third embodiment of the present invention. In the following, the configuration of the OLT 3a will be described, focusing on the portions that differ from those of the configurations of the OLT 3 of the first embodiment and the OLT 3a of the second embodiment.

In the present embodiment, the configuration of the TDMA-PON system 1 having the multi-level phase modulation ONU 2 and the OLT 3b will be described as an example, but the system capable of providing the present invention is not limited to this configuration. For example, the present invention is not limited to a PON system and can be applied to all burst optical communication networks having a Point-to-Multipoint configuration or a Multipoint-to-Multipoint configuration.

As shown in FIG. 6, the OLT 3b includes a coherent receiver 30b, a dynamic band allocation unit 31b, and a PON frame processing unit 33b.

The coherent receiver 30b includes a digital signal processing unit 310b. The digital signal processing unit 310b includes a frequency offset compensation unit 320b for each of the x-polarized wave and the y-polarized wave, a carrier phase synchronization unit 330b for each of the x-polarized wave and the y-polarized wave, a phase noise amount detection unit 340b, a phase noise compensation unit 350b, and a switch 360b. The carrier phase synchronization unit 330b includes a moving average filter 332b.

The dynamic band allocation unit 31b includes the logical information storage unit 32. The logical information storage unit 32 stores logical information. As described above, the logical information includes information indicating the arrival time of each signal of the uplink burst frame signal used in the dynamic band allocation (DBA).

The PON frame processing unit 33*b* includes an algorithm switching unit 36.

The OLT 3*b* according to the present embodiment switches to a means for compensating phase noise by using a polarization pilot when the reception performance cannot be improved by a means for variable control of the block length N of the moving average filter 332*b* due to a large phase noise amount of a new multi-level phase modulation ONU 2 in the detection of the phase noise amount by the phase noise amount detection unit 340*b*.

As the means for compensating the phase noise by using the polarized pilot, for example, the technique described in the following reference literature can be used. "Reference Literature: S. Y. Kim, et al., "Performance Analysis of Phase Noise Cancellation by Asymmetric CMA for Realizing Affordable Coherent PON Transceivers," Journal of Light-wave Technology, Vol. 38, No. 8, pp. 2231-2241, Apr. 15, 2020."

When the phase noise amount measured by the phase noise amount detection unit 340*b* is equal to or greater than a predetermined value, the OLT 3*b* performs reception signal processing on the uplink burst frame signal from each multi-level phase modulation ONU 2 by using a phase noise compensation means by the phase noise compensation unit 350*b*. The phase noise compensation unit 350*b* compensates phase noise by using the polarization pilot.

On the other hand, when the phase noise amount is less than the predetermined value, the OLT 3*b* performs reception signal processing on the uplink burst frame signal from each multi-level phase modulation ONU 2 by using a carrier phase synchronization means by the carrier phase synchro-nization unit 330*b*.

Specifically, when the phase noise amount measured by the phase noise amount detection unit 340*b* is equal to or greater than a predetermined value, the algorithm switching unit 36 of the PON frame processing unit 33*b* switches the switch 360*b* as necessary, and thereby controls the phase noise compensation unit 350*b* to perform reception process-ing. On the other hand, when the phase noise amount measured by the phase noise amount detection unit 340*b* is less than the predetermined value, the algorithm switching unit 36 switches the switch 360*b* as necessary, and thereby controls the carrier phase synchronization unit 330*b* to perform reception processing.

The configuration of the reception processing by the carrier phase synchronization of the OLT 3*b* in the present embodiment is the same as that of the reception processing of the OLT 3*a* according to the second embodiment.

Since the OLT 3*b* uses one polarized wave as a pilot when the phase noise compensation means is used, the transmis-sion speed becomes half that of the case where the carrier phase synchronization means is used.

According to the TDMA-PON system of each of the embodiments described above, since the block length of the moving average filter of carrier phase synchronization in the OLT is variably controlled, phase noise different for each ONU can be allowed for a multi-level phase modulation burst frame signal while preventing the system configuration from becoming complicated.

According to each of the embodiments and variations described above, the communication device (apparatus) has a reception unit (receiver) and a control unit (controller). For example, the reception unit (receiver) is the front end 300 in an embodiment, and the control unit (controller) is digital signal processing units 310, 310*a*, and 310*b* in an embodi-ment. The reception unit (receiver) receives burst frame signals from a plurality of other communication devices, respectively. For example, another communication device is a multi-level phase modulation ONU 2 in an embodiment. The control unit (controller) changes the block length of the moving average filter in carrier phase synchronization so as to minimize a phase noise amount of a burst frame signal.

The communication device (apparatus) may further include a measurement unit (measurer). For example, the measurement unit (measurer) is the phase noise amount detection unit 340 in an embodiment. The measurement unit (measurer) measures a phase noise amount from a preamble of a burst frame signal. In this case, the control unit (controller) changes the block length for each burst frame signal.

The preamble of a burst frame signal may be a signal subjected to on-off keying modulation.

The communication device (apparatus) may further include a measurement unit (measurer). For example, the measurement unit (measurer) is the phase noise amount detection unit 340*a* in an embodiment. The measurement unit (measurer) measures a phase noise amount from a burst frame signal at the time of the execution of a discovery operation. In this case, the control unit (controller) changes the block length for each execution cycle of the discovery operation.

In this case, the control unit (controller) may change the block length on the basis of information indicating the arrival time of each burst frame signal used in dynamic band allocation.

The burst frame signal obtained at the time of the execu-tion of the discovery operation may be a signal on which on-off keying modulation has been performed.

The communication device (apparatus) may further include a compensation unit (compensator). For example, the compensation unit (compensator) is the phase noise compensation unit 350*b* in an embodiment. The compensa-tion unit (compensator) compensates phase noise by using the polarization pilot. In this case, when the phase noise amount is equal to or greater than a predetermined value, the control unit (controller) does not perform carrier phase synchronization, and causes the compensation unit (com-pensator) to compensate the phase noise.

Some or all of the OLT 3, OLT3*a* and OLT 3*b* in the embodiments described above may also be realized by a computer. In such a case, the program to realize this function may be recorded on a computer-readable recording medium, and the program recorded on the recording medium may be read and executed by a computer system. The term "com-puter system" herein includes an OS and hardware such as peripheral devices. The "computer-readable recording medium" refers to a portable medium such as a flexible disk, an optical magnetic disk, a ROM, and a CD-ROM, and other storage devices such as a hard disk which are built in a computer system. The "computer-readable recording medium" may also include a medium that holds the program dynamically for a short period, such as a communication line in a case where the program is transmitted over a network such as the Internet or a communication line such as a telephone line, or a medium that holds the program for a fixed period, such as a volatile memory provided inside the computer system that serves as a server or a client in the case described above. Also, the program described above may be a program for realizing some of the aforementioned func-tions, a program that can realize the aforementioned functions in combination with a program that has already been recorded in the computer system, or a program that is realized using a programmable logic device such as a FPGA (Field Programmable Gate Array).

While the embodiments of this invention have been described in detail with reference to the drawings thus far, the specific configurations are not limited to the embodiments, and design or the like which does not depart from the gist of the invention is also included.

REFERENCE SIGNS LIST

1 . . . TDMA-PON system
4 . . . Optical power splitter
5 . . . Optical fiber
21 . . . Laser light source
22 . . . Wavelength locker
23 . . . Multi-level modulation unit
30, 30a, 30b . . . Coherent receivers
31, 31b . . . Dynamic band allocation unit
32 . . . Logical information storage unit
33, 33b . . . PON frame processing unit
34 . . . Memory
35 . . . Switching unit
36 . . . Algorithm switching unit
300 . . . Front end
301 . . . Loval oscillation lice source
310, 310a, 310b . . . Digital signal processing unit
320, 320a, 320b . . . Frequency offset compensation units
330, 330a, 330b . . . Carrier phase synchronization units
332, 332a, 332b . . . Moving average filters
340, 340a, 340b . . . Phase noise amount detection units,
341 . . . Amplitude determination unit
342 . . . On-data selection unit
343 . . . Phase difference acquisition unit
347 . . . Variance value calculation unit
348 . . . $\sigma\_\varphi^2$-N table
350b . . . Phase noise compensation unit
360b . . . Switch

The invention claimed is:

1. A communication device of a time division multiplexing passive optical network that includes the communication device and a plurality of communication devices, the communication device being an optical line termination device, the plurality of communication devices being optical network units, each having a different laser light source and each generating a burst frame signal by multilevel-modulating laser light output from the laser light source in wavelength synchronization with local oscillation light output from a local oscillation light source of the communication device, the communication device comprising:

a receiver that coherently receives the burst frame signal respectively transmitted from the plurality of communication devices by using the local oscillation light source;

a measurer that measures a phase noise amount from a preamble of the received burst frame signal or from the burst frame signal when a discovery operation is executed; and a controller that changes a block length of a moving average filter in carrier phase synchronization of a coherent receiver so as to minimize a phase noise amount of the burst frame signals for each received burst frame signal or for each execution period of the discovery operation.

2. The communication device according to claim 1, wherein the preambles of the burst frame signals are signals on which on-off keying modulation is performed.

3. The control device according to claim 1, wherein the controller changes the block length on the basis of information indicating an arrival time of each burst frame signal used in dynamic band allocation.

4. The communication device according to claim 1, wherein the burst frame signal obtained at the time of execution of the discovery operation is a signal on which on-off keying modulation is performed.

5. The communication device according to claim 1, the communication device further comprising:

a compensator that compensates phase noise using a polarization pilot, wherein when the phase noise amount is equal to or greater than a predetermined value, the controller does not perform the carrier phase synchronization, and causes the compensator to compensate the phase noise.

6. A communication method used by a communication device of a time division multiplexing passive optical network that includes the communication device and a plurality of communication devices, the communication device being an optical line termination device, the plurality of communication devices being optical network units each having a different laser light source and each generating a burst frame signal by multilevel-modulating laser light output from the laser light source in wavelength synchronization with local oscillation light output from a local oscillation light source of the communication device, the communication method comprising:

coherently receiving the burst frame signal respectively transmitted from the plurality of communication devices by using the local oscillation light source;

measuring a phase noise amount from a preamble of the received burst frame signal or from the burst frame signal when a discovery operation is executed; and changing a block length of a moving average filter in carrier phase synchronization of a coherent receiver so as to minimize a phase noise amount of the burst frame signals for each received burst frame signal or for each execution period of the discovery operation.

7. The control device according to claim 1, wherein the measurer selects, in time series, only data in an on-state where an optical power is present from the preamble, and performs a predetermined arithmetic processing on two adjacent data in the selected time series to calculate a variance value of a phase difference as the phase noise amount.

8. The control device according to claim 1, wherein the measurer selects, in time series, only data in an on-state in which an optical power is present from the burst frame signal when the discovery operation is executed, and sets the variance of a phase difference calculated by performing a predetermined arithmetic operation on two adjacent data in the selected time series as the phase noise amount.

* * * * *